Figure 1:
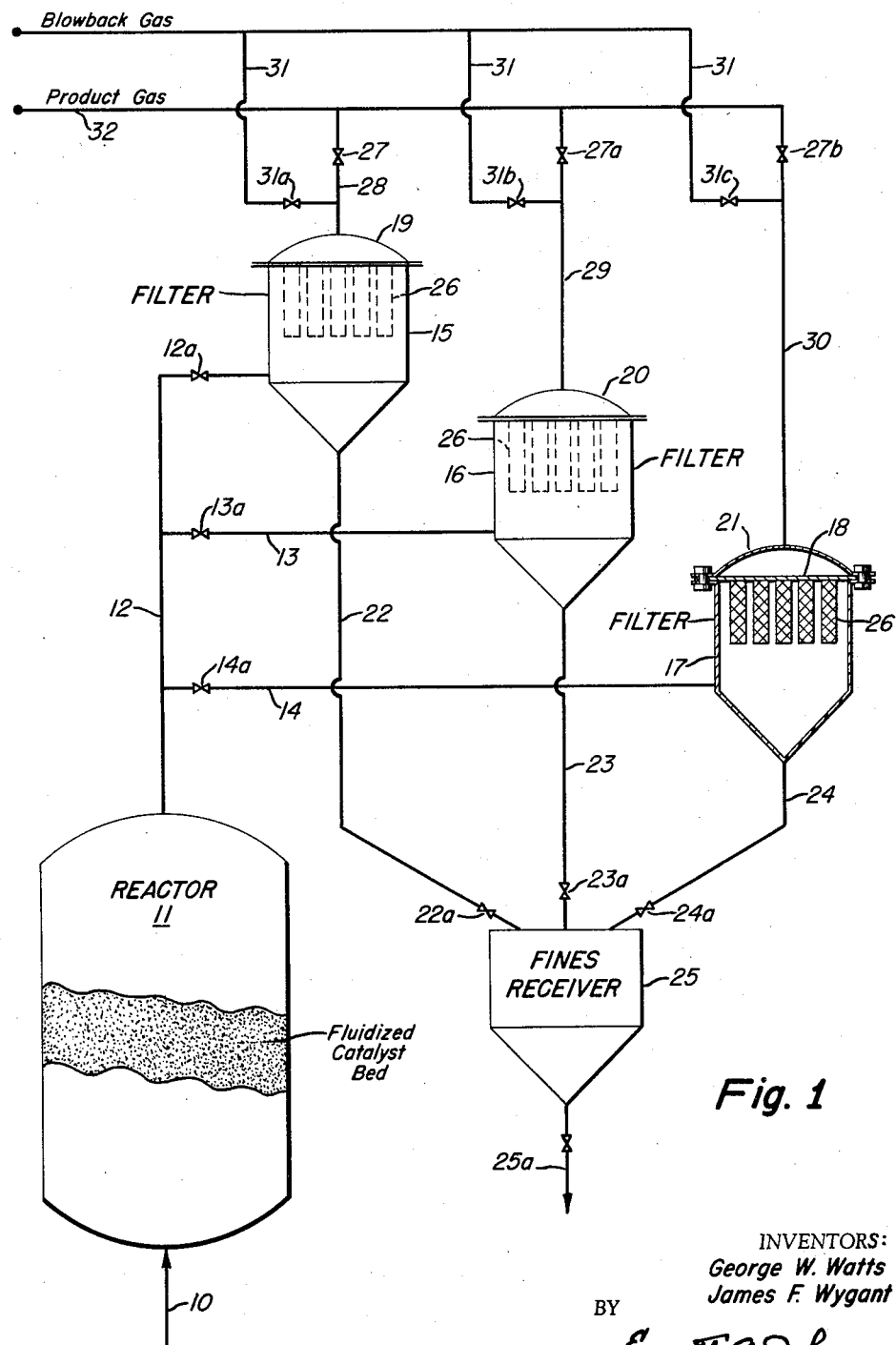

June 30, 1959 G. W. WATTS ET AL 2,892,512
FLOW LIMITING FILTER VALVE
Filed Aug. 16, 1957 2 Sheets-Sheet 1

INVENTORS:
George W. Watts
James F. Wygant
BY
Everett A. Johnson
ATTORNEY

# United States Patent Office 2,892,512
Patented June 30, 1959

2,892,512

FLOW LIMITING FILTER VALVE

George W. Watts, Flossmoor, and James F. Wygant, Rich Township, Cook County, Ill., assignors to Standard Oil Company, Chicago, Ill., a corporation of Indiana Application August 16, 1957, Serial No. 678,679

4 Claims. (Cl. 183—44)

This invention relates to improvements in flow limiting valves and more particularly relates to such valves on filter systems for separating finely divided solids from gasiform fluids at high temperature.

The problem of removing finely divided solids from hot gases is common in fluidized catalyst reaction systems and ceramic filters have been proposed for this purpose but have not been heretofore found satisfactory. For example, tubular filters suspended by collars or flanges at the top ends have failed in hot gas service. This failure has been caused primarily by mechanical and thermal stresses, the tubes acting as fixed-end cantilevers.

In such a system a contacting gas is passed upwardly through a catalyst bed, the reacted gases being withdrawn through a top portion of the contacting vessel. The removed gases contain small amounts of entrained fine catalyst and these entrained catalyst fines must be removed from the gases in order to avoid plugging subsequent process equipment and in order to avoid contamination of the product.

Several means are available for this separation, such as electrostatic precipitation, cyclone separators, oil or water scrubbing, and filtration. Cyclones are not capable of removing the finest solids; electrostatic precipitation is an incomplete separation in units of practical size; oil or water scrubbing wastes much of the sensible heat of the product and also complicates subsequent processing. For complete separation of entrained catalyst fines and for conservation of sensible heat, hot gas filtration is preferred. However, such filtrations introduce filter life problems.

It is, therefore, a primary object of this invention to provide a tubular ceramic filter apparatus which avoids the undesirable cantilever and fixed-end characteristics. A further object of the invention is to provide a system which is resistant to mechanical stresses and vibration. Another object of the invention is to provide a system of substantially greater strength than heretofore possible while having substantial resistance to thermal shock. Still another object of the invention is to provide a filter unit which is compact and which may be readily used in various types of vessels. An additional object of the invention is to provide a filter structure which may be used in parallel with similar filter structures and wherein the failure of one will not permit bypassing of unfiltered gases. Those and other objects of the invention will become apparent as the description thereof proceeds.

Briefly, according to this invention a tubular ceramic filter is held in axial compression by a spring and tie-rod. One end of the tubular filter is provided with an end-closure and the other end is provided with a flow-port through which the tie-rod extends. Slidably mounted upon the tie-rod in the region of the flow-port is a plug member which by its construction comprises a flow limiting valve in the event of failure of the high pressure drop tubular filter.

The plug member is flared outwardly and is associated with a flow-restricting plate superposing the flow-port and being adjustable to control the flow-response of the plug member. Upon failure of the tubular filter, the increased flow of gasiform fluids through the flow-port will, by acting on the flow-restricting plate and upon the lower face of the plug member, lift the plug member into the flow-port, thereby effectively closing the port and removing the faulty filter unit from service.

Figure 2:
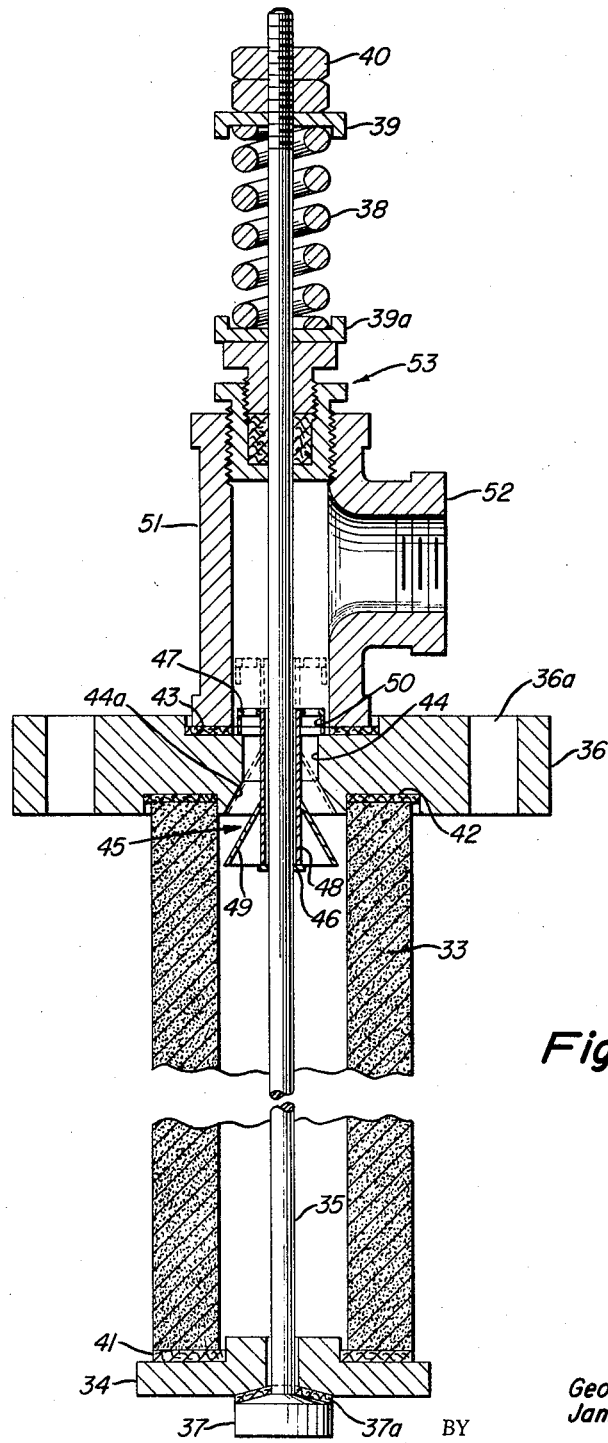

Further details and advantages of the invention will be described in conjunction with the accompanying drawings wherein:

Figure 1 is a diagrammatic representation of a typical fluidized catalyst gas reaction system employing filter units constructed in accordance with this invention; and Figure 2 is a vertical section through a single filter unit including the flow limiting valve.

Referring to Figure 1, feed gas from line 10 enters the reactor 11 containing a fluidized catalyst bed. The effluent gases from reactor 11 are conducted by overhead lines 12, 13, and 14 to the associated filter cases 15, 16, and 17. Within the filter cases a plurality of filter units 17 supported by tube sheets 18. The filtered gases collect within the headers 19, 20, and 21 and the removed solids accumulate within the lower shells of the filter cases and flow by discharge lines 22, 23, and 24 into the fines receiver 25.

As finely divided solids are separated from the gases by the filters 17 the solids build up in a "cake" on the surfaces of the filters 26. This results in either a decrease in the flow rate through the filter 26 or an increase in the pressure drop through the filter. In either event, it is desirable to limit the rise of pressure drop or the decrease in flow rate, and this is done by "blowback."

The flow of product gas through one of the parallel filter cases 15, 16, and 17 is shut off by one of valves 27 in transfer lines 28, 29, and 30. Gas at a pressure higher than that of the reaction system is introduced through another valved line 31 downstream of the filter case in question and such blow-back gas flows through the bank of filters in reverse direction. Ordinarily the operating flow is from the outside of the filter unit toward the hollow core.

With multiple filter cases, cyclic blow-back schedules may be established so that at approximately uniform intervals one filter case is blown back while the others remain in operation. During blow-back of one filter case, the blow-back gas is caused to flow backward through the product lines 28, 29, or 30, joining the product gas which is being exhausted from a reactor 11 through lines 12, 13, and 14 into the remaining filter cases.

It may be desired to use a gas other than product gas for blowback, either to avoid compressing and sometimes reheating of clean product gas for blow-back or to prevent "recirculation" of fines from the filters being blown back into the other filter cases. If this is done, block valves may also be provided on the product inlet lines to the cases, and an auxiliary nozzle and valve provided on each case to dispose of blow-back gas.

The filter case 17 is provided with the header 21 and the tube sheet 18 supports the filter units 26. The filtered gases are withdrawn from the header 21 by line 30 and the separated solids are withdrawn from the conical shell of the filter case 17 by means of line 24. The operation and construction of the other filter cases 15 and 16 are similar to case 17.

The tubular filter 33 may be of any reasonable length and tubes 36" or longer may be used. The upper and lower ends of the tubes 33 have square filter ends and the tube walls are relatively thick in comparison to diameter, for example 0.5" or more thick in a 3.0" O.D.

tube. The tube material is an inorganic refractory and for most purposes silicon carbide is preferred. Other materials, such as aluminum oxide, synthetic mullite, etc., may be used instead of silicon carbide, particularly under highly oxidizing conditions.

The tubes 33 may be formed in any conventional manner. They may be self-bonded by heating; bonded by addition of clay, glass, feldspar, or other vitrifiable materials which bond upon heating; or bonded by addition of certain chemicals, such as phosphates or silicates.

The end-closure 34 is of heat-resisting steel and engages the lower end of the tubular filter element 33. A tie-rod 35 passes longitudinally through the tubular filter element 33 and extends below the closure 34 and above the top-closure 36 which is supported by the tube sheet 18. The lower end of the tie-rod 35 is secured outside of the closure 34 by such means as welding, a welded head, a pin or wedge, or by an upset head 37 as shown.

A spring 38 concentric to the tie-rod 35 and at the upper end thereof is supported above the top-closure 36 and compressed under the washer 39 so that the tie-rod 35 is in tension. This tension is calculated to withstand any internal pressure on the closure 34 during blow-back but to be well below the axial force bearable by the ceramic tube 33. The head washer 39 is adjustable on the rod 35 by means of lock nuts 40. The gaskets 41 and 42 disposed between the ceramic tube 33 and the closures 34 and 36 may be of asbestos or other material suitable to the operating temperature and the seal washers 43 and 37a can be similarly constructed.

As described above, the failure of the filter tube 33 will result in a large flow of solids-laden gases through the orifice 44 of the top-closure plate 36 in the filter unit 26. This is undesirable and the apparatus shown in Figure 2 avoids this condition, the valve 45 being designed to shut off the flow of gases in case of failure of a filter 26.

The valve plug 49 is of the type known as a "butterfly" but is actuated by accelerated gas flow rather than by a stem. It is neither spring-loaded nor externally counterweighed and has no packings or hinges to be maintained. The one essential clearance about the tension rod 35 is protected by a dust seal 46. A perforated plate 47, which is part of the assembly including the sleeve 48 and the truncated conical plug 49, positions the valve plug 49 exactly and is designed so that at excessive or accelerated flow rates the pressure drop across the plate 47 aids in lifting the sleeve 48 to close the valve by placing the conical plug 45 within the conforming valve seat 44a about the orifice 44.

The valve seat 44a is machined into the top-closure plate 36 and the plug 49 seals against the contact face or valve seat 44a when the valve plug 49 is lifted by the excessive gas flow. The valve plug 49 is preferably of metal but for moderate temperature service may be of plastic and may have an elastomer coating or covering over either metal or plastic. The elastomer provides resistance to erosion or corrosion and further permits sufficient deformation to insure a tight seal.

The plug 49 is made adequately rigid as by substantial wall thickness, ribs, or a bottom plate closing the base of the plug or by cutting the plug from a solid bar. The sleeve 48 can be integral with the plug 49.

The angle or taper of the plug 49 normally will correspond to that of the valve seat 44a on the top-closure plate 36. However, it is contemplated that the contacting surface of the plug 49 or seat 44a may be spheroidal or ellipsoidal to give more positive line contact. The sleeve 48 may be integral with the plug 49 as described above or may be a separate tubular member secured to it. In either event, the bore of the sleeve 48 is such that a sliding fit on the tension rod 35 results. If desired, a dry solid lubricant may be used in the sleeve.

The lower end of the sleeve 48 is provided with the dust seal 46 and for low temperature service the dust seal may comprise an elastomer tubular extension of the sleeve 48. Such extension would compress to make a tight seal around the tension rod 35 when the valve 45 is in closed position, by virtue of the pressure differential across the valve.

The support 47 may be a perforated plate as shown or may comprise a spider having three or more separate arms. In either event, the imperforate area of the support 47 is selected so that the pressure drop across the support 47 at high flow rates will provide sufficient lifting force to place the valve 45 in its closed position. The feet 50 on which the support 47 rests provide sufficient free area about and below the support 47 so that the valve 45 remains open at normal flow rates.

Under normal conditions, flow rates through the orifice 44 will be relatively low, the flow being limited by the filter tube 33, and most of the total pressure drop will be across the tube 33 of the filter 26. Should the filter tube 33 break, the flow rate will be limited chiefly by the orifice 44 in the top-closure plate 36 and the flow rate and pressure drop through the orifice 44 will increase many-fold. To assure functioning of the valve 45, it is only necessary that the closure plate orifice 44 be small enough to take a considerable part of the total pressure drop. In a particular system, the flow rate at which the valve 45 will close is governed by the weight of the valve assembly, the proportion of open flow area in the support 47, the spacing of the support 47 by the feet 50, and of course the size of the top closure plate orifice 44. To adjust the response of the valve mechanism 45, removable weights, plugs, and the like may be provided which may be added or removed to make the adjustment.

It will be apparent that the support 47 must be assembled to the sleeve 48 and plug 49 through the top-closure plate orifice 44. This may be done by any suitable connecting device, for example, such as a drilled and tapped hole in the support 47 and a shouldered thread on the upper end of the sleeve 48. Other demountable fastening means may be used, however, it is also contemplated that the plug 49 may be of a deformable elastomer so that it may be compressed for insertion through the orifice 44. Such construction offers the additional advantage of pressure drop sealing of the plug 49 against the seat 44a when employed in moderate to low temperature installations.

The dust seal 46 is not intended to support the valve assembly 45 on the tension rod 35, the position of the valve 49 relative to the orifice 44 critical and better positioning being obtained by permitting the valve assembly 45 to rest on feet 50 on the top-closure plate 36. In this connection, adjustment of the response and sensitivity of the valve may be achieved by providing feet or legs 50 which are adjustable in height. For example, the feet 50 may comprise threaded studs or bolts. By so controlling the longitudinal dimensions, the position of the dust seal 46 can be fixed during assembly by a nut or tapered key (not shown) on the tension rod 35 and in this event the dust seal 46 can be made to support the valve assembly 45. With a fixed seal 46, the complete failure of the filter tube 33 would release the tension rod 35, which in turn will be retracted by the spring 38, and the dust seal 46 carries with it the valve assembly 45 and retains it in its closed position across orifice 44 during blow-back operations.

In Figure 2, the fitting 51 is provided to accommodate the support 47 of the valve 45. The orifice 44 may discharge directly into a header above the tube sheet on which top-closure plate 36 is fixed. However, for individual filters or for filters manifolded externally by piping we include the nipple 52 on T fitting 51 for connection to such piping.

A packing gland 53 about the tension rod 35 is also included in such assembly but may be omitted when the individual filters discharge to an internal header.

Although described with respect to a preferred embodiment wherein the filter tube 33 is maintained under compression, the valve mechanism 45 may be used in other types of gas filters such as conventionally suspended filter tubes or in any gas piping where it is desirable to cut off flow in the event of a loss of flow resistance in the system.

From the description herein it will be apparent that the objects of the invention have been attained, however, the detailed description of the several embodiments of the invention is intended for the purpose of illustration only. Accordingly, it is contemplated that modifications can be made in the described systems without departing from the scope of the invention.

What we claim is:

1. A flow limiting valve comprising a housing, a valve port in said housing, tension rod means extending through said port axially of said housing and projecting above and below said housing, a flow-displaceable plate means having flow-restricting port means therethrough and disposed above said valve port, a guide sleeve about said tension rod and fixed to said displaceable plate means, and an inverted truncated conical valve plug member carried by said sleeve and adapted to close said valve port, said displaceable plate, guide sleeve, and valve plug being adapted to move longitudinally of said tension rod when flow through said housing displaces said plate means.

2. A flow limiting valve comprising a depending gas-permeable tube, a bottom closure for said tube, a top closure for said tube, a valve port in said top closure, tension rod means extending axially of said tube and projecting below said bottom closure and above said top closure through said valve port, pressure drop plate means disposed across said valve port, a sleeve about said tension rod and fixed to said plate means, an inverted truncated conical valve plug member carried by said sleeve and adapted to conform to the taper of said valve port in said top closure plate, said plate, sleeve, and plug being adapted to move longitudinally of said tension rod, and a dust seal adjacent the lower end of said sleeve and about said tension rod.

3. A filter assembly for high temperature use which comprises a depending filter tube, a lower closure plate closing the lower end of said tube, an upper closure plate closing the upper end of said tube, a valve port in said upper closure plate, tension rod means extending axially of said filter tube and securing said tube between said lower plate and said upper plate, flow-restricting plate means disposed above said valve port in said top closure plate, means for spacing said plate from the surface of the top closure plate above said valve port, inverted truncated conical plug member having a sleeve portion slidably carried by said rod and having a taper corresponding to the taper of said valve port in said top closure plate, and a dust seal about the lower end of said sleeve portion in sliding fit with said tension rod.

4. A filter assembly which comprises a depending filter tube, a lower closure plate, an upper closure plate, said closure plates closing the lower and upper ends, respectively, of said filter tube, a valve port in said upper closure plate, an outlet fitting disposed about the port in said upper closure plate, tension rod means extending axially of said filter tube and projecting below said lower plate and above said upper plate through said outlet fitting, a perforated plate means disposed across said valve port in said top closure plate, feet on said perforated plate spacing it from the surface of the top closure plate about said valve port, a sleeve depending from said perforated plate about said tension rod, an inverted truncated conical plug member carried by said sleeve and having a taper adapted to conform to the taper of said port in said top closure plate, the said perforated plate, sleeve, and plug being adapted to move longitudinally along said tension rod, and a dust seal about the lower end of said sleeve in sliding fit with said tension rod.

References Cited in the file of this patent

UNITED STATES PATENTS

| 1,499,710 | Weisgerber | July 1, 1924 |
| 2,208,466 | Lopez | July 16, 1940 |
| 2,528,375 | Lilly | Oct. 31, 1950 |
| 2,760,595 | Pynor | Aug. 28, 1956 |

FOREIGN PATENTS

| 303,763 | Great Britain | Jan. 4, 1929 |